(12) United States Patent
Radue et al.

(10) Patent No.: US 10,041,456 B2
(45) Date of Patent: Aug. 7, 2018

(54) SYSTEM AND METHOD FOR VIBRATION RESISTANT ROLLOVER VALVE

(71) Applicant: Kohler Co., Kohler, WI (US)

(72) Inventors: Martin L. Radue, Plymouth, WI (US); William D. Koenigs, Fond du Lac, WI (US)

(73) Assignee: KOHLER CO., Kohler, WI (US)

( * ) Notice: Subject to any disclaimer, the term of this patent is extended or adjusted under 35 U.S.C. 154(b) by 0 days.

(21) Appl. No.: 15/612,154

(22) Filed: Jun. 2, 2017

(65) Prior Publication Data

US 2017/0370335 A1 Dec. 28, 2017

Related U.S. Application Data

(60) Provisional application No. 62/355,635, filed on Jun. 28, 2016.

(51) Int. Cl.
*F02M 37/00* (2006.01)
*F16K 17/36* (2006.01)
*F02M 37/20* (2006.01)

(52) U.S. Cl.
CPC ........ *F02M 37/0023* (2013.01); *F02M 37/20* (2013.01); *F16K 17/366* (2013.01); *F02M 37/007* (2013.01); *Y10T 137/0874* (2015.04)

(58) Field of Classification Search
CPC . Y10T 137/0874; F16K 31/18; F16K 24/042; F16K 17/366; F16K 17/36; F02M 37/0023; F02M 37/20
See application file for complete search history.

(56) References Cited

U.S. PATENT DOCUMENTS

| | | | |
|---|---|---|---|
| 4,685,584 A | 8/1987 | Roberts | |
| 4,716,920 A | 1/1988 | Crute | |
| 4,736,863 A | 4/1988 | Roberts | |
| 5,172,714 A * | 12/1992 | Kobayashi et al. | B60K 15/03519 137/202 |
| 5,738,132 A * | 4/1998 | Zakai et al. | B60K 15/03519 137/38 |
| 7,273,042 B2 * | 9/2007 | Kito | B60K 15/03519 123/516 |
| 7,677,225 B2 | 3/2010 | Radue et al. | |
| 2008/0017254 A1 * | 1/2008 | Kaneko | F16K 31/1635 137/493 |

FOREIGN PATENT DOCUMENTS

WO 2017/042988 A1 3/2017

OTHER PUBLICATIONS

Extended European Search Report for European Patent Application No. EP 17 17 8219 dated Nov. 23, 2017, 7 pages.

* cited by examiner

*Primary Examiner* — Kevin Lee
(74) *Attorney, Agent, or Firm* — Klintworth & Rozenblat IP LLP (57) ABSTRACT

A system includes a fuel delivery system of an engine, the fuel delivery system including a vent tube, walls providing a seat and forming a cavity at an opening of the vent tube, a floor of the cavity, the floor including a convex portion protruding from the floor, and a stopper in the cavity for sitting in the seat during a rollover situation.

15 Claims, 10 Drawing Sheets

SECTION A-A

SYSTEM AND METHOD FOR VIBRATION RESISTANT ROLLOVER VALVE

CROSS REFERENCE TO RELATED APPLICATION

This application claims priority benefit from U.S. Provisional Application Ser. No. 62/355,635, which was filed on Jun. 28, 2016, which is incorporated by reference in its entirety.

BACKGROUND

Fuel delivery systems can deliver fuel into internal combustion engines.

SUMMARY

According to one aspect, systems and methods provide a fuel delivery system of an engine, the fuel delivery system including a vent tube, walls providing a seat and forming a cavity at an opening of the vent tube, a floor of the cavity, the floor including a convex portion protruding from the floor, and a stopper in the cavity for sitting in the seat during a rollover situation.

Other systems, methods, features, and advantages is or will become apparent upon examination of the following figures and detailed description. It is intended that all such additional systems, methods, features, and advantages be included within this description and be protected by the accompanying claims.

BRIEF DESCRIPTION OF THE DRAWINGS

In association with the following detailed description, reference is made to the accompanying drawings, where like numerals in different figures can refer to the same element. The features of the drawings are not necessarily drawn to scale.

DETAILED DESCRIPTION

While the disclosure may be susceptible to embodiment in different forms, there is shown in the drawings, and herein is described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It is further appreciated that in some embodiments, one or more elements illustrated by way of example in a drawing(s) may be eliminated and/or substituted with alternative elements within the scope of the disclosure.

Figure 1A:
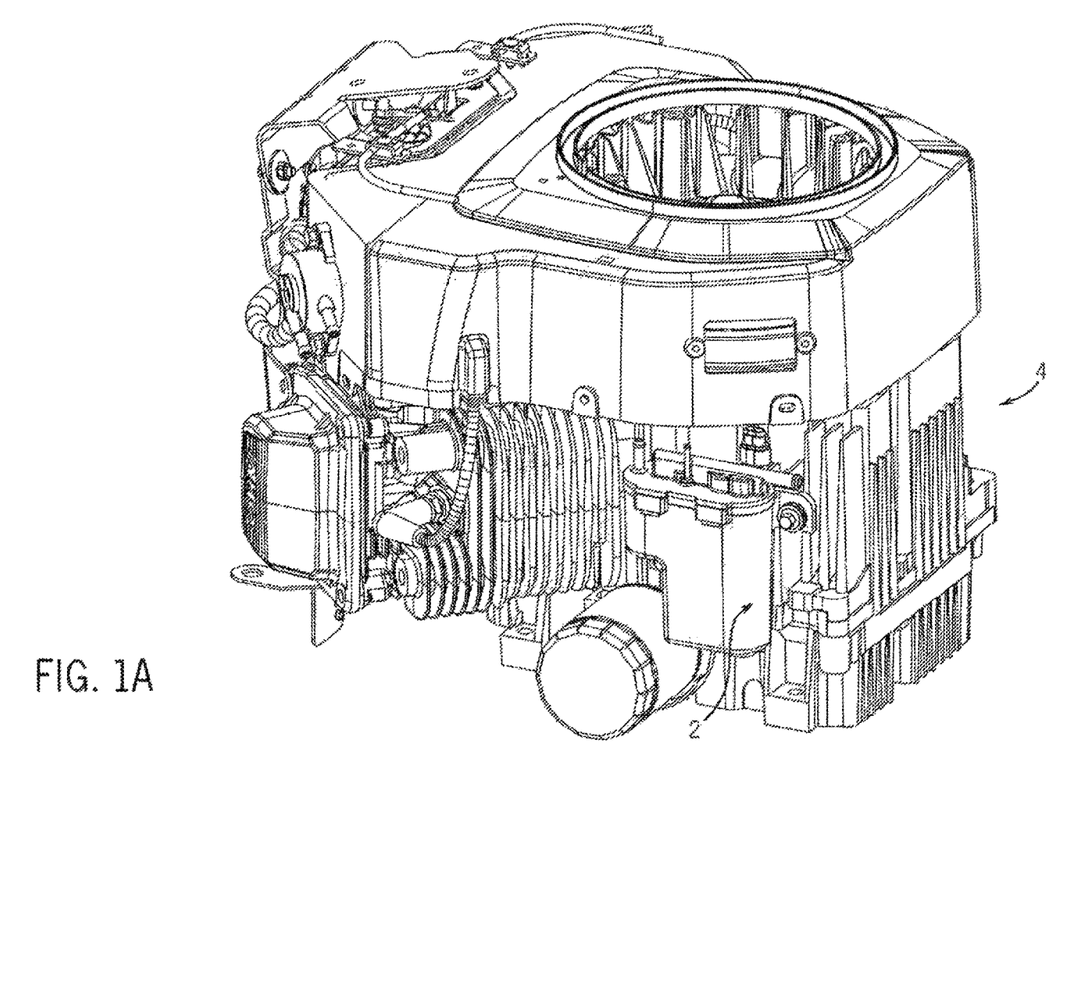
FIG. 1A is a perspective view of an example engine mounted fuel delivery system as installed on an engine.

Referring to FIG. 1A, an engine mounted fuel delivery system (hereinafter referred to more simply as a "fuel delivery system") 2 in accordance with at least one embodiment is shown to be installed on an engine 4. The engine 4 is a small utility internal combustion engine capable of being employed in a variety of applications including, for example, a variety of types of power machinery. For example, the engine 4 can be a Command Twin vertical-crankshaft internal combustion engine manufactured by Kohler Company of Kohler, Wis. Although not shown, it will be understood that in some cases the engine 4 can be employed in land vehicles such as lawn mowers, snow blowers, and other small vehicles such as utility vehicles. In alternate embodiments, it is also possible the fuel delivery system 2 of FIG. 1A or other embodiments of fuel delivery systems are implemented in conjunction with other types of engines (e.g., other than small utility engines) and/or in conjunction with other types of applications and/or vehicles.

In FIG. 1A, it is envisioned that the fuel delivery system 2 is installed onto the engine 4 by the engine's manufacturer. However, it is also envisioned that the fuel delivery system 2 can be sold as an after-market add-on product capable of being installed on an engine by a party other than the engine's manufacturer. Additionally, the fuel delivery system 2 can be implemented in conjunction with, and to deliver pressurized fuel to, an Electronic Fuel Injection (EFI) system provided on the engine 4. Nevertheless, the fuel delivery system 2 can be used with other types of engine components as well, and need not necessarily be utilized with an EFI system.

Figure 1B:
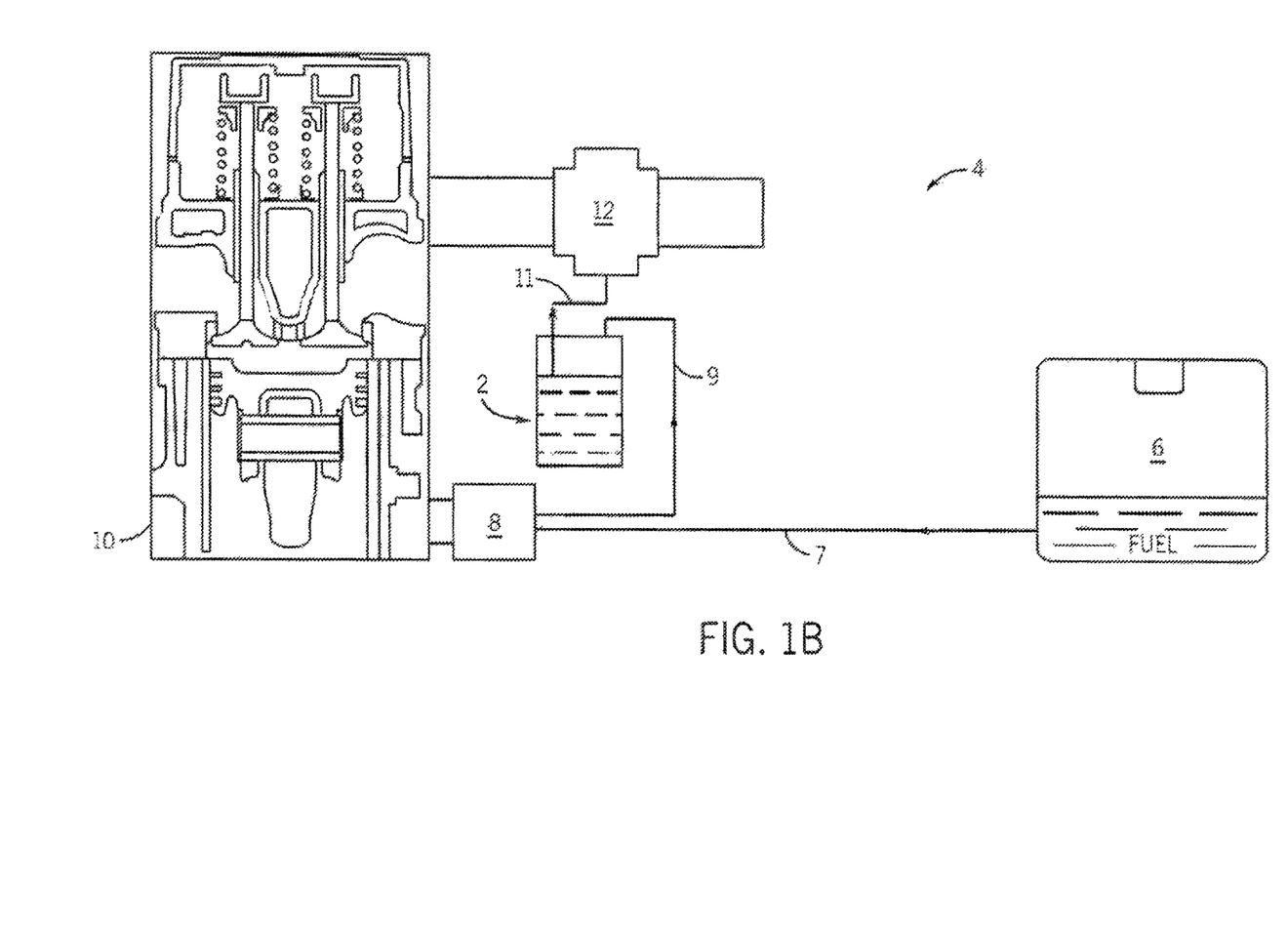
FIG. 1B is a schematic representation showing in more detail certain components of the engine mounted fuel delivery system and the engine of FIG. 1A.

Referring additionally to FIG. 1B, an additional schematic representation is provided showing both the fuel delivery system 2 and certain components of the engine 4 in conjunction with which the fuel delivery system is implemented. The fuel delivery system 2 receives low-pressure fuel from a primary fuel tank 6. More particularly, fuel is drawn out of the primary fuel tank 6 via a primary connector 7 by the pumping action of a primary fuel pump 8 located on or adjacent to the engine 4. In at least some embodiments, the primary fuel pump Bis a low-pressure fuel pump and can take the form of, for example, a mechanical diaphragm pump or a pulse-style pump. However, in alternate embodiments, other types of fuel pumps can also be used.

Further due to the pumping action of the primary fuel pump 8, fuel is pumped away from the primary fuel pump to the fuel delivery system 2 via a secondary connector 9 linking those two structures. Thus, fuel from the primary fuel tank 6 is communicated to the fuel delivery system 2. Also as shown, the primary fuel pump 8 can be directly supported upon an engine crankcase 10. Upon reaching the fuel delivery system 2, and as described in detail below with reference to FIGS. 2-3, the fuel delivery system 2 in turn provides additional pumping action. As a result of the operation of the fuel delivery system 2, pressurized fuel exits the fuel delivery system via a pressurized connector 11 and reaches an engine intake fuel system 12. As mentioned above, the engine intake fuel system can take the form of an EFI system, although this need not be the case in every embodiment.

Figure 2:
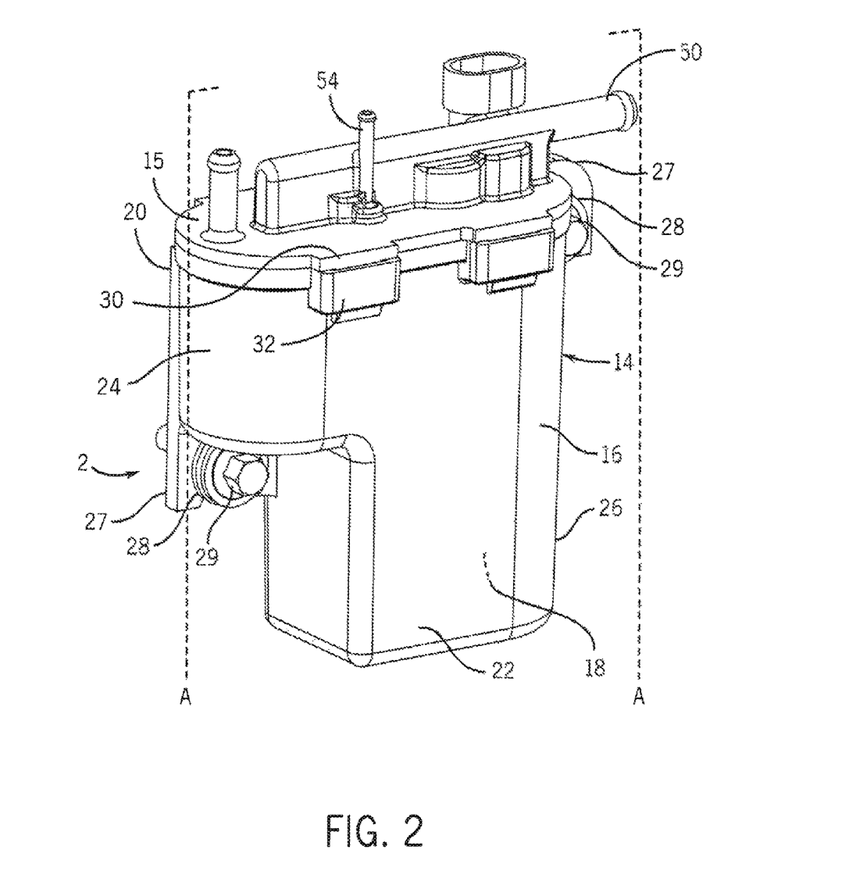
FIG. 2 is a perspective view of the engine mounted fuel delivery system of FIG. 1A.

In FIG. 2, a perspective view is provided showing the fuel delivery system 2 (and particularly the exterior thereof) in more detail. As shown, the fuel delivery system 2 includes a housing 14 having a top portion 15 and a bottom portion 16. The top portion 15 and bottom portion 16 together define a reservoir chamber 18 internal to the housing 14 that is capable of receiving and storing fuel. More particularly, the top portion 15 of the housing 14 complementarily fits upon the upper end of the bottom portion 16, so as to define and enclose the reservoir chamber 18, with the top portion substantially serving as a lid for the bottom portion. In at least one embodiment, the housing 14 of the fuel delivery system 2 is made from a non-metallic, electrically insulated material, for example, plastic, carbon fiber and/or fiberglass, although it is contemplated that other materials suitable for holding fuel can be used as well.

Further in FIG. 2, the bottom portion 16 of the housing 14 has a mounting side 20, a profile side 22, a left end 24, and a right end 26, in addition to its bottom end (not shown). Further, the mounting side 20 and profile side 22 have minimal or no curvature (e.g., are substantially flat), while the left and right ends 24, 26 are curved in an outward, convex manner. Also, the widths of the mounting side 20 and profile side 22 are substantially greater in extent than the widths of the left and right ends 24, 26, such that the width of the housing 14 is substantially greater than its depth (e.g., greater than the distance between the mounting and profile sides) of the housing. Due to the dimensional characteristics of the housing 14 and flatness of the mounting and profile sides 20, 22, the fuel delivery system 2 has a substantially flat overall appearance. When mounted to the engine 4, the fuel delivery system 2 can be mounted flush to the side of the engine and does not protrude outward from the engine to an excessive extent.

Although FIG. 2 shows aspects of the exterior appearance of one embodiment of the housing 14 and the fuel delivery system 2, it should be understood that the exterior appearance can vary depending upon the embodiment from that shown. For example, although in the embodiment of FIG. 2 the left and right ends 24, 26 have a slight curvature to accommodate the internal components of the fuel delivery system (as described further with respect to FIG. 3), in alternate embodiments the left and right ends can take on different shapes. In particular, the shapes and dimensions of various aspects of the housing 14 and the fuel delivery system 2 can be modified depending upon or customized to suit a particular engine or vehicle with which the fuel delivery system is to be implemented. In some circumstances, the shape and dimensions can be varied so that the fuel delivery system 2 fits within a desired mounting space, to achieve desired air flow characteristics around the engine, or for a variety of other reasons.

Additionally in FIG. 2, the housing 14 includes a pair of mounting tabs 27 incorporated into the mounting side 20 of the bottom portion 16. The mounting tabs 27 allow the fuel delivery system 2 to be secured to the engine 4. More particularly, this is achieved by way of additional fastening components shown in the present embodiment to include a pair of grommets 28 and a pair of bolts 29, which extend through the mounting tabs 27. Upon being tightened with respect to the engine 4, the bolts 29 hold the mounting tabs 27 in place with respect to the engine. The grommets 28 in particular extend on both sides of each of the mounting tabs 27. When the bolts 29 are tightened with respect to the engine 4, the grommets 28 are wedged in between the mounting tabs 27 and the heads of the bolts 29 (or washers positioned adjacent to those heads), and also between the mounting tabs and the engine itself. In alternate embodiments, the fuel delivery system 2 can be secured to/mounted upon the engine 4 by way of a single mounting tab/bolt (or more than two of each), or by way of one or more other mechanisms or components including, for example, snapping mechanisms.

In FIG. 2, the top and bottom portions 15, 16 of the housing 14 are two distinct pieces that are secured together by way of two pairs of male latch portions 30 extending from the top portion 15 and two pairs of complementary female latch portions 32 formed on the bottom portion 16. FIG. 2 in particular shows one of the pairs of male latch portions 30 and one of the pairs of female latch portions 32 positioned along the profile side 22 of the bottom portion 16 of the housing 14. Although not shown, it will be understood that the others of the pairs of male and female latch portions 30, 32 are positioned along the mounting side 20 of the bottom portion 16 of the housing 14. The male and female latch portions 30, 32 are respectively configured so that the female latch portions 32 are respectively capable of receiving the respective male latch portions 30 in a snap-fit manner. In alternate embodiments, the numbers of male and female latch portions that are used can vary from two pairs of each of those latch portions (e.g., to more or less than four apiece), although there will usually be at least two male latch portions and two female latch portions, typically positioned along opposite sides of the housing 14. Additionally, one or more other mechanisms or components can be used to fasten the top and bottom portions 15, 16 of the housing 14 to one another, or possibly those portions can even be plastic welded or otherwise fastened together to form an integral housing.

Figure 3:
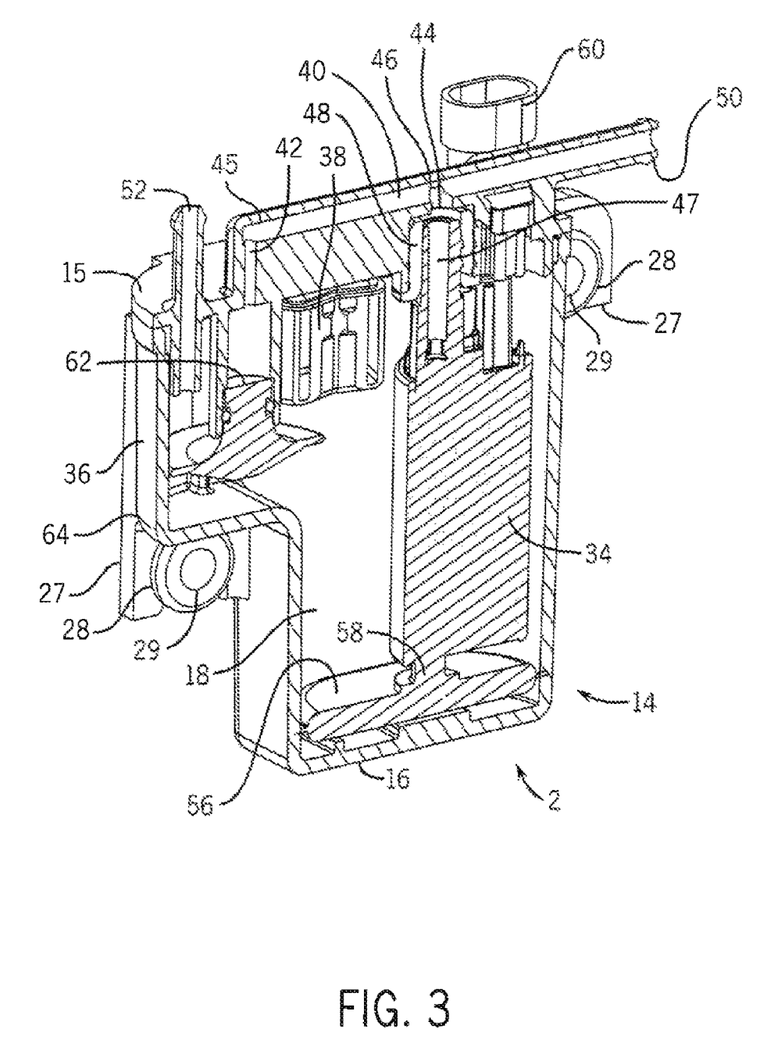
FIG. 3 is a further cross-sectional view of the engine mounted fuel delivery system of FIGS. 1 and 2, taken along line A-A of FIG. 2.

Referring additionally to FIG. 3, a further, cross-sectional view of the fuel delivery system 2 taken along line A-A of FIG. 2 is provided to illustrate in greater detail various internal components of the fuel delivery system. As shown, the housing 14 in particular supports therewithin an additional fuel pump 34, a pressure regulator 36 and a float mechanism 38. The bottom portion 16 of the housing 14 serves to define the reservoir chamber 18 almost entirely, except insofar as the upper surface of the reservoir chamber is defined instead by the top portion 15 of the housing. The top portion 15 of the housing, in addition to enclosing the reservoir chamber 18, also has formed therewithin a supply passage 40, a regulating passage 42 and a pump passage 44, each of which is a substantially linear, tubular passage. The supply passage 40 extends in a substantially horizontal manner along nearly the entire length of the top portion 15, while each of the regulating passage 42 and pump passage 44 intersects the supply passage and extends in a substantially vertical manner downward from the supply passage. Although the supply, regulating and pump passages 40, 42 and 44 are referred to herein as separate passages, they can all generally be considered to form a single overall supply passage.

More particularly, the regulating passage 42 extends downward from a first end 45 of the supply passage 40 to the pressure regulator 36, which is positioned between the regulating passage and the reservoir chamber 18. The pump passage 44 extends downward from an intermediate location 46 along the supply passage 40 to a fuel pump outlet 47 of the fuel pump 34. The fuel pump outlet 47 is mounted so as to extend at least partially into the pump passage 44 along a pump interface segment 48 of the pump passage, so as to achieve proper sealing between the fuel pump outlet 47 and the pump passage. In some examples, the fuel pump 34 is removably attached to the pump passage 44.

Additionally, the supply passage 40 also includes, opposite the first end 45, a discharge end 50 that extends horizontally outward away from the remainder of the top portion 15 (the intermediate location 46 being between the first and discharge ends 45, 50). The discharge end 50 serves as the fuel outlet for the fuel delivery system 2 and, as discussed above with respect to FIG. 1B, is connected to the engine fuel intake system 12 by way of the pressurized connector 11. In at least some embodiments, the engine fuel intake system 12 can be one or more fuel injectors (not shown) of an EFI system or a fuel supply rail (not shown).

Referring FIG. 3, the top portion 15 further includes an inlet tube 52 extending substantially vertically upward from the top portion. The inlet tube 52, which constitutes the fuel inlet for the fuel delivery system 2, forms a channel linking the reservoir chamber 18 to a location above the top portion 14. As discussed with respect to FIG. 1B, the inlet tube 52 in particular is capable of receiving fuel from the secondary connector 9, which in turn receives fuel from the primary fuel tank 6 via the primary connector 7 and the primary fuel pump 8. Upon receiving fuel from the secondary connector 9, the inlet tube 52 directs that fuel into the reservoir chamber 18, and to some extent can be said to isolate the fuel within the reservoir chamber 18 from the primary fuel tank 6 and the primary fuel pump 8.

In at least some examples, the secondary connector 9 (as well as possibly the primary connector 7) is a flexible rubber hose, although various other types of connectors can be used such as a rigid metal tube. Likewise, in at least some examples, the pressurized connector 11 is a flexible rubber hose, although various other types of connectors can be used such as a rigid metal tube. Through the use of the primary, secondary and pressurized connectors 7, 9 and 11, and particularly when those components are flexible, the fuel delivery system 2 can be mounted upon the engine 4 in a variety of positions and manners relative to the primary fuel tank 6, the primary fuel pump 8, and the engine intake fuel system 12, as well as relative to other engine and/or vehicle components.

Fuel entering the fuel delivery system 2 via the inlet tube 52 is stored in the reservoir chamber 18. The float mechanism 38, in FIG. 3, is hingedly attached to the lower surface of the top portion 15 facing the reservoir chamber 18, and is positioned to open and close a vent tube 54 (shown in FIG. 2) that also extends through the top portion 15 between the reservoir chamber 18 and the external environment. The float mechanism 38 in particular is configured to react to the fuel level in the reservoir chamber 18 and effectively close the vent tube 54 when the fuel level within the reservoir chamber 18 reaches a certain threshold. Further, the float mechanism 38 substantially prevents fuel from flowing out of the reservoir chamber 18 via the vent tube 54 of the fuel delivery system 2, and/or the engine 4 on which the fuel delivery system is mounted, are overturned. Typically, the float mechanism 38 is detachable from the top portion 15.

The vent tube 54 allows fuel vapors to vent to the external environment when the float mechanism 38 is open. However, in at least some embodiments the vent tube 54 does not lead from the reservoir chamber 18 to the external environment, but rather is coupled to the engine intake system 12 (or to another location) by way of an additional connector such as another rubber hose. In such embodiments, the vent tube 54 and additional connector allow fuel vapors from the reservoir chamber 18 to be vented to the engine intake system 12 (or to another location) rather than to the external environment, thereby potentially reducing fuel vapor emissions to the environment.

Also, in other examples, the float mechanism 38 can be employed to govern fluid flow through the inlet tube 52 rather than the vent tube 54. More particularly, in some examples, the float mechanism 38 can be hingedly to the lower surface of the top portion 15 facing the reservoir chamber 18 below the inlet tube 52, and positioned so as to close the inlet tube when the fuel level within the reservoir chamber reaches a threshold level and to otherwise be open (or at least openable when fuel is directed toward the reservoir chamber through the inlet tube). In further alternate examples, float mechanisms can be employed both in relation to the vent tube 54 and the inlet tube 52.

Referring still to FIG. 3, the additional fuel pump 34 extends vertically between the pump passage 44 at which is located the fuel pump outlet 47, and a reservoir chamber bottom 56, at which is located a fuel pump inlet 58. In at least some examples, the additional fuel pump 34 is a high-pressure fuel pump, in contrast to the primary fuel pump 8, which is a low-pressure fuel pump. The use of a high-pressure fuel pump as the additional fuel pump 34 is particularly appropriate when the fuel delivery system 2 is operating to supply pressurized fuel to an EFI system. Nevertheless, in alternate embodiments, the absolute and relative pressure levels of the fuel output by the primary and additional fuel pumps 8, 34 can take on a variety of levels. Further, in at least some embodiments, the additional fuel pump 34 is an electric turbine pump, although other types of pumps such as those employing gerotors or rolling vane components can be used in alternate embodiments.

The additional fuel pump 34 can be supplied with power in a variety of manners. In the present embodiment, the additional fuel pump 34 operates on 12 Volt Direct Current (DC) power such as that readily available from a battery on a utility engine equipped vehicle, although in other embodiments the additional fuel pump can be configured to utilize other types of power (e.g., 6 Volt DC power). Further, in some examples the additional fuel pump 34 is supplied with electrical power by way of electrical leads (not shown) extending through and exiting out of an exterior surface of the top portion 15 of the housing 14. The external terminals of the electrical leads are situated in an electrical connector 60, which can take the form of a plug-type fitting allowing for convenient connection and disconnection from a power source.

To the extent that a more efficient type of pump such as an electric turbine pump is used as the additional fuel pump 34, the drain of power and current from the power source (e.g., battery) of the engine 4 can be reduced relative to what it otherwise might be (e.g., reduced by 3 amps). Further, while it is envisioned that typically the additional fuel pump 34 will be driven by way of electrical power supplied via the electrical leads, in alternate embodiments, the additional fuel pump 34 can operate using other types of power. For example, the additional fuel pump 34 can be powered by an internal electrical source (e.g., an internal battery within the fuel pump), or even possibly driven mechanically way of a rotating shaft that extends outward through the housing 14 and is driven by an external motor or other device.

Additionally in FIG. 3, the pressure regulator 36 has a regulator inlet side 62 and a regulator outlet side 64. The regulator inlet side 62 is at least partially situated in the lowermost end of the regulating passage 42 opposite the end intersecting the supply passage 40, while the regulator outlet side 64 opens to the reservoir chamber 18. Given an appropriate pressure differential between the supply passage 40/regulating passage 42 and the reservoir chamber 18 across the pressure regulator 36 (typically where the pressure within the supply passage 40/regulating passage 42 exceeds that of the reservoir chamber 18 by a predetermined amount), the pressure regulator 36 allows fuel to flow in one direction, namely, from the regulating passage 42 back into the reservoir chamber 18.

Based upon the above description it is apparent that in at least some embodiments, the fuel delivery system 2 can be assembled as follows. First, the top and bottom portions 15, 16 of the housing 14 are formed, with the bottom portion largely containing the reservoir chamber 18 and the top portion including the supply passage 40, regulating passage 42 and pump passage 44. Next, the additional fuel pump 34 is coupled to the pump passage 44 and the pressure regulator 36 is coupled to the regulating passage 42. Also, the float mechanism 38 is coupled to the top portion 15. Finally, the top and bottom portions 15, 16 are assembled together to define the reservoir chamber 18, with the pressure regulator 36 and the additional fuel pump 34 extending from the supply passage 40/regulating passage 42/pump passage 44 toward and into the reservoir chamber when the top and bottom portions are so assembled.

During operation of the fuel delivery system 2, the reservoir chamber 18 is filled by way of the inlet tube 52 with fuel from the primary tank 6 via the primary connector 7, primary fuel pump 8, and secondary connector 9. Once the reservoir chamber 18 is filled to a threshold level, the float mechanism 38 closes the vent tube 54 to prevent the reservoir chamber 18 from overfilling. Additionally, assuming that the additional fuel pump 34 is operating, the additional fuel pump 34 will pump fuel up from the reservoir chamber 18 into the pump passage 44, to the supply passage 40 and the regulating passage 42, and out the discharge end 50 to the engine intake fuel system 12 via the pressurized connector 11.

Due to variations in the fuel demands of the engine 4, or due to other reasons including merely the ongoing operation of the additional fuel pump 34, the supply passage 40 (as well as the regulating and pump passages 42, 44) can experience excessive pressure due to the operation of the fuel pump 34 as it drives fuel towards the engine fuel intake system 12. When the supply passage 40 (and the regulating and pump passages 42, 44) experiences a fuel pressure level relative to that within the reservoir chamber 18 that exceeds the tolerance of the pressure regulator 36, the pressure regulator 36 allows fuel from the supply passage 40 to be returned to the reservoir chamber, thereby relieving the excessive fuel pressure within the supply passage 40. Depending upon the embodiment, the threshold tolerance of the pressure regulator 36 can take on a variety of levels, and potentially the tolerance of the pressure regulator can be varied in real time based upon operational conditions of the fuel delivery system 2 or the engine 4.

Given that the fuel delivery system 2 allows over-pressurized fuel to flow back into the reservoir chamber 18, there is no need for any additional return line to be provided between the fuel delivery system 2 (and particularly the supply passage 40/fuel pump outlet 47) and the primary fuel tank 6 in order to accommodate fuel passing through the pressure regulator 36. Nor need any additional hole be formed in the primary fuel tank 6 to accommodate such an additional return line. Further, by providing the additional fuel pump 34 and the pressure regulator 36 within the housing 14 in an integrated, modular manner, there is no need to mount multiple, separate components such as a separate pressure regulator and a separate high-pressure fuel pump upon the engine 4. Rather, only the overall fuel assembly 2 need be mounted to the engine 4.

Given the aforementioned characteristics, the fuel delivery system 2 is particularly suitable for use in conjunction with a variety of different types of engines, as well as with a variety of different types of vehicles and/or applications employing such engines, since the fuel delivery system 2 is capable of being readily implemented (or at least readily adapted for implementation) in conjunction with such various engines and/or vehicles despite different characteristic features of the engines and/or vehicles. That is, the fuel delivery system 2 is largely (if not entirely) universal in terms of its ability to be mounted on and used in conjunction with a variety of types of engines and/or vehicles.

Although applicable to a variety of different types of engines and engine applications, the fuel delivery system 2 is appropriate for use in conjunction with small utility engines, which themselves are typically intended to be universally (or largely universally) applicable to a wide variety of vehicles or other applications (particularly since the manufacturers of the engines and manufacturers of the vehicles or other application components tend to be different parties). The fuel delivery system 2, given its unitary housing 14 containing each of the reservoir chamber 18, supply passage 40 (and regulating and pump passages 42, 44), pressure regulator 36, and additional fuel pump 34, has a particularly compact, integrated and modular nature that enables it to be implemented in a manner that is consistent with and does not detract from the universality of the engines themselves.

More particularly, since the fuel delivery system 2 eliminates the need for a fuel return line between the pressure regulator 36 and the primary fuel tank 6, and because there is no need to mount the various components of the fuel delivery system (e.g., the pressure regulator 36 and the additional fuel pump 34) independently of one another upon an engine or other supporting structure, the fuel delivery system 2 can be easily moved around to different support locations depending upon the requirements of the vehicle or other structure(s) with which the engine is being implemented. Also, in at least some embodiments such as that described above, the fuel delivery system 2 need not excessively protrude outward from a supporting engine on which it is mounted, which can be particularly advantageous when the engine itself is to be implemented on a vehicle or in another application where space is at a premium.

The fuel delivery system 2 also is particularly advantageous for use in conjunction with engines having EFI systems. Not only does the integrated, modular nature of the fuel delivery system 2 reduce the complexity and consequently the costs of implementing the fuel delivery system in a given engine, but also the fuel delivery system 2 also can be readily and easily added to a carburetor-equipped engine that is being modified to an EFI engine. More particularly, when modifying a carbureted engine into an EFI engine, the fuel delivery system 2 can be simply installed by mounting the fuel delivery system onto the engine as a single module, connecting the output of the original fuel pump associated with the carbureted engine to the inlet tube 52 of the fuel delivery system 2, and connecting the discharge end 50 of the fuel delivery system 2 to the EFI system.

Figure 4:
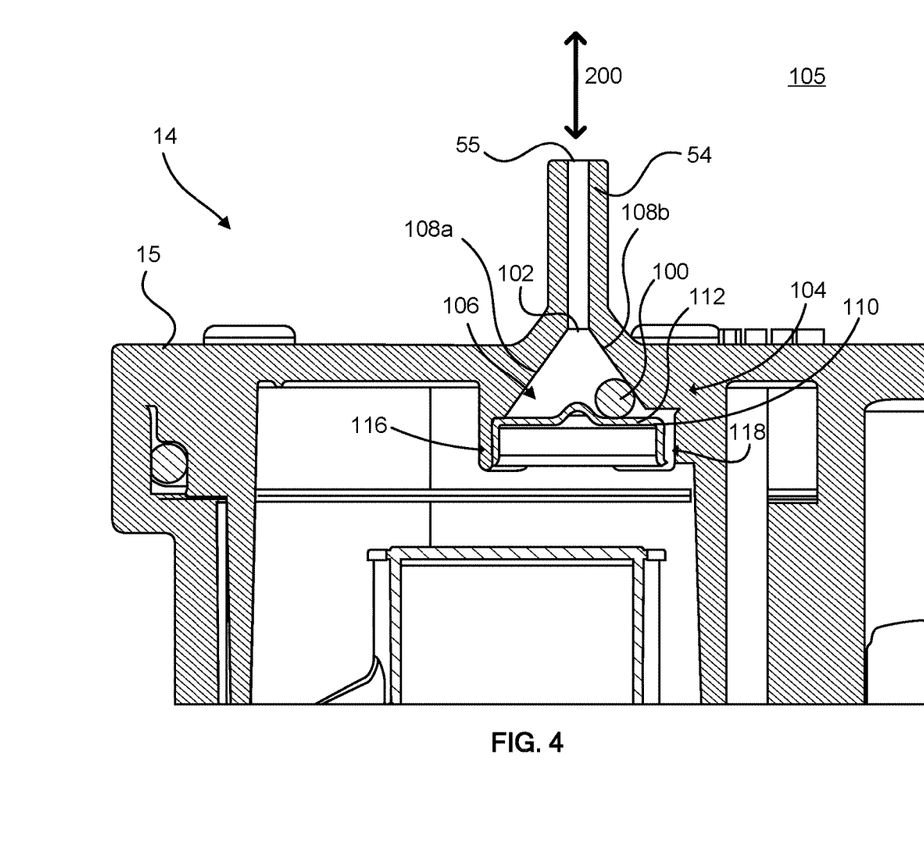
FIG. 4 is a partial side cutaway view of an example rollover valve arrangement for the vent tube.

FIG. 4 is a partial side cutaway view of an example rollover valve arrangement for the vent tube 54 of the fuel delivery system 2. The rollover valve arrangement for the vent tube 54 can be used with the fuel delivery system 2 described above and/or with other types of fuel delivery systems. The rollover valve arrangement can also be used in other implementations, e.g., with the inlet tube 52. For purposes of explanation, the rollover valve arrangement is described with the vent tube 54 which can be formed with or attached to the top portion 15 the housing 14 of the fuel delivery system 2.

In one example, during normal operation, a stopper 100 sits in an open cavity 106 provided by walls 108a, b, and below the vent tube 54. In some examples the stopper 100 is a ball. The stopper 100 can be made of metal or other materials. Different shapes of the stopper 100 can be used, including but not limited to an oval, a square, a rectangle, a pyramid, etc. In an vehicle/engine 4 rollover situation, the stopper 100 moves to sit in seat 102 positioned at an entrance of the vent tube 54 to block and/or seal off any outflow of fuel, etc. through the vent tube 54, e.g., into the environment 105. The stopper 100 can move back to the open cavity 106 to unblock the vent tube 54 when the engine 4 is back in a normal upright position.

Using the example above, the fuel pump 34 can be part of the fuel pump module 104. The walls 108a, b form the seat 102 at an opening of the vent tube 54. The walls 108a, b can be positioned at an angle away from the seat 102. The angle of the walls 108a, b can be formed at an angle of about 10 to 80 degrees away from the seat 102, or more particularly about 30 to 50 degrees, e.g., depending on an implementation. In one implementation, the walls 108a, b form opposite sides of a frustum conical shaped structure. Other shapes of the structure can be used, including but not limited to a frustum square, triangle, pyramid, pentagon, etc. The walls 108a, b can be straight, curved, concentric, non-concentric, etc.

In some examples, a lower cup 110 is positioned in a lower part of the cavity 106 to support the stopper 100. The lower cup 110 provides a floor 112 of the cavity 106 for the stopper 100 to rest on. A convex portion 114 of the floor 112 protrudes above an otherwise generally flat plane of the floor 112 so that the stopper 100 is unable to rest on that convex portion 114 of the floor 112. In some examples, the lower cup 110 can sit within three equally spaced legs 116 (one shown) forming three alternatively spaced flow path openings 118 (one flow path 118 shown opposite leg 116). Other numbers of legs 116 and flow paths 118 can be used, and they need not be equally spaced, e.g., depending on an implementation. The flow paths 118 allow vapers to flow from the fuel pump module 104 to the environment 105 or other part of the engine 4, e.g., when the float mechanism 38 is open. The legs 116 can include an inwardly biased force to apply pressure to the lower cup 110 to keep the lower cup 110 in place.

During normal operation, the convex portion 114 of the lower cup 110 can help ensure that the stopper 100 does not rest naturally in a simple line with the vent tube 54, and is therefore unlikely to bounce during jostling to directly engage/block the vent tube 54 (which, if pressure differentials are such, can otherwise cause the stopper 100 to stick there and cause fuel problems). In some examples, the convex portion 114 of the lower cup 110 is positioned in a center of the floor 112 to align with a line of axis 200 of the seat 102 and vent opening 55 of vent tube 54. Other positions of the convex portion 114 on the floor 112 are possible depending on an implementation, e.g., off-center from the line of axis 200. The convex portion 114 can include a variety of shapes including round, a dimple, half moon, square, rectangular, triangular, etc., or other shapes, including nonconcentric shapes. In some examples, there may be more than one convex portion 114 positioned on the floor 112, e.g., a plurality of convex portions 114 positioned in a pattern or non-pattern.

The angled walls 108a, b and/or the convex portion(s) 114 of the floor 114 prevent the stopper 100 from freely moving straight up and down in the cavity 106, e.g., when the fuel pump module 104 which is mounted on the engine 4 vibrates up and down. Otherwise, the stopper 100 can get stuck in the seat 102, e.g., from a pressure differential between the fuel pump module 104 and environment 105 which can cause the fuel pump module 104 to become vapor locked, not refilling, leading to the engine 4 stalling. In one implementation, the angled walls 108a, b and/or the convex portion 114 of the floor 112 misalign the stopper 100 from the seat 102, so any motion or vibration causes the stopper 100 to hit a walls 108a,b deflecting the stopper 100 away from the seat 102. The convex portion 114 of the floor 112 deflects the stopper 100 in the cavity 106 from direct alignment with the seat 102. During a roll over event the stopper 100 can still reach the seat 102 and seal off outflow to the environment 105.

Figure 5A:
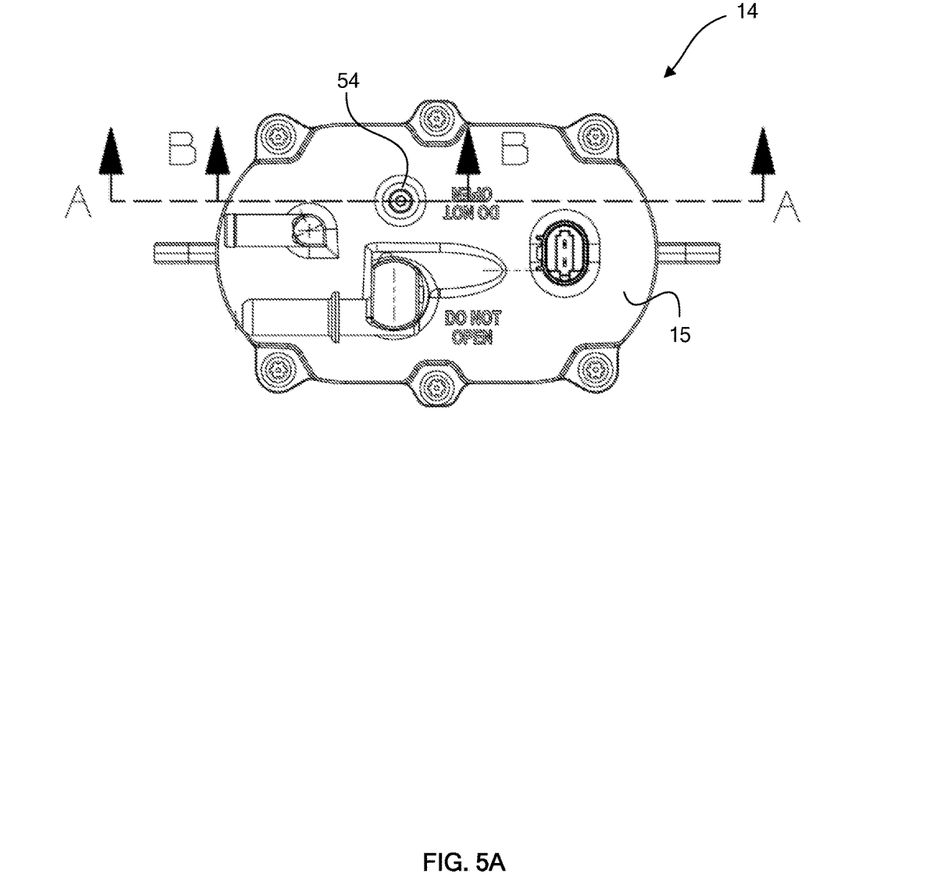
FIGS. 5A-D are schematics of the example rollover valve arrangement.
Figure 5B:
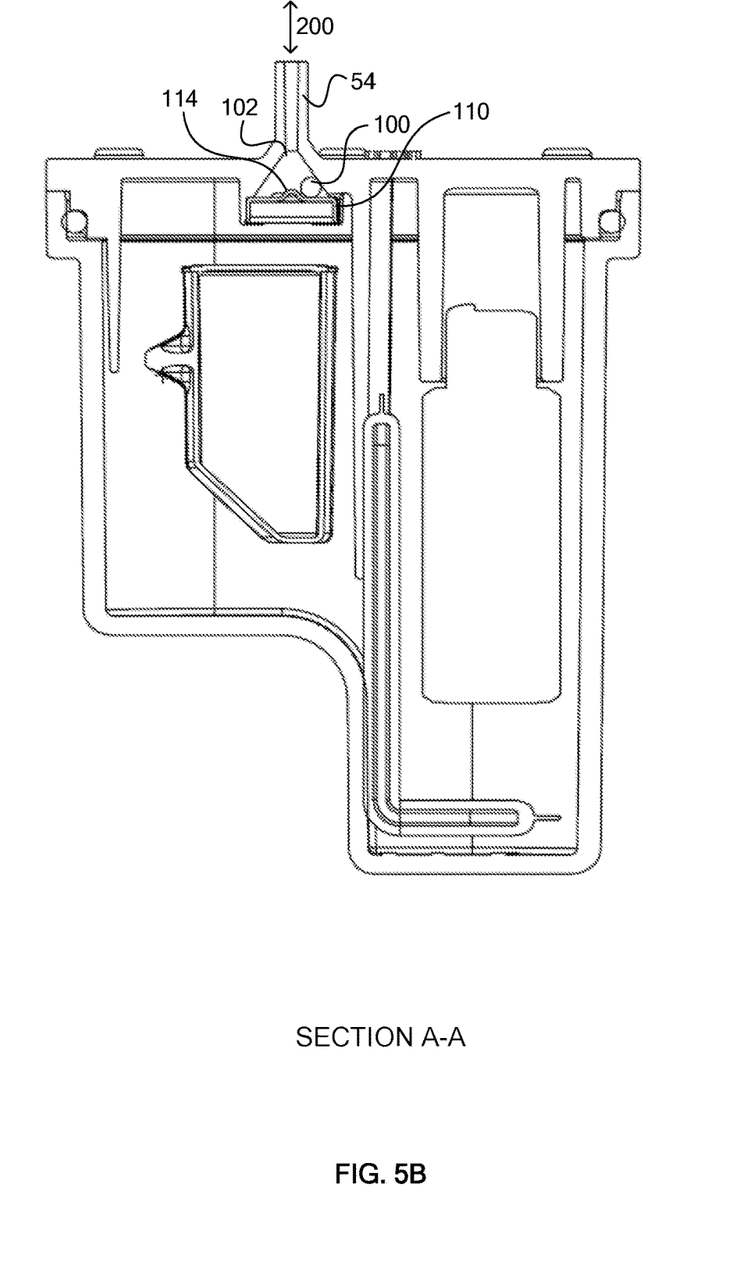
Figure 5C:
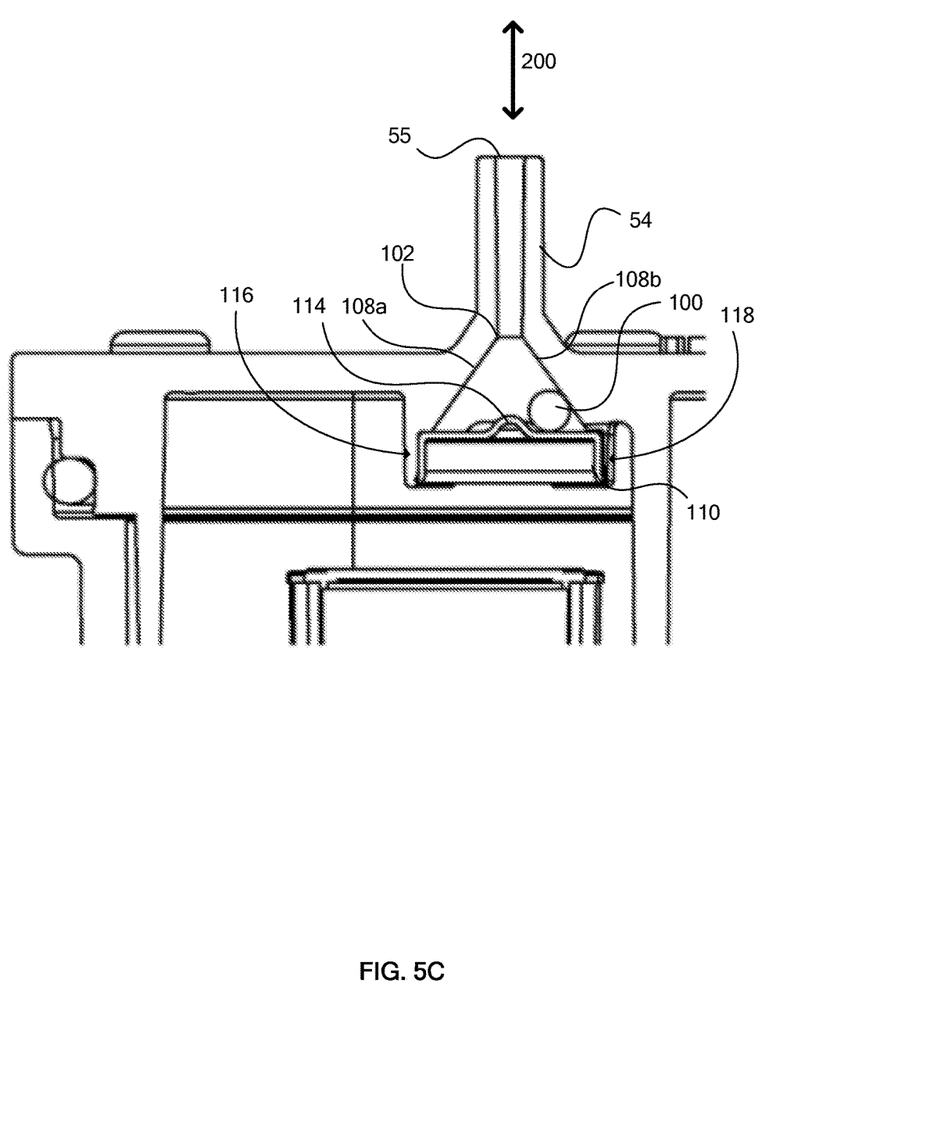
Figure 5D:
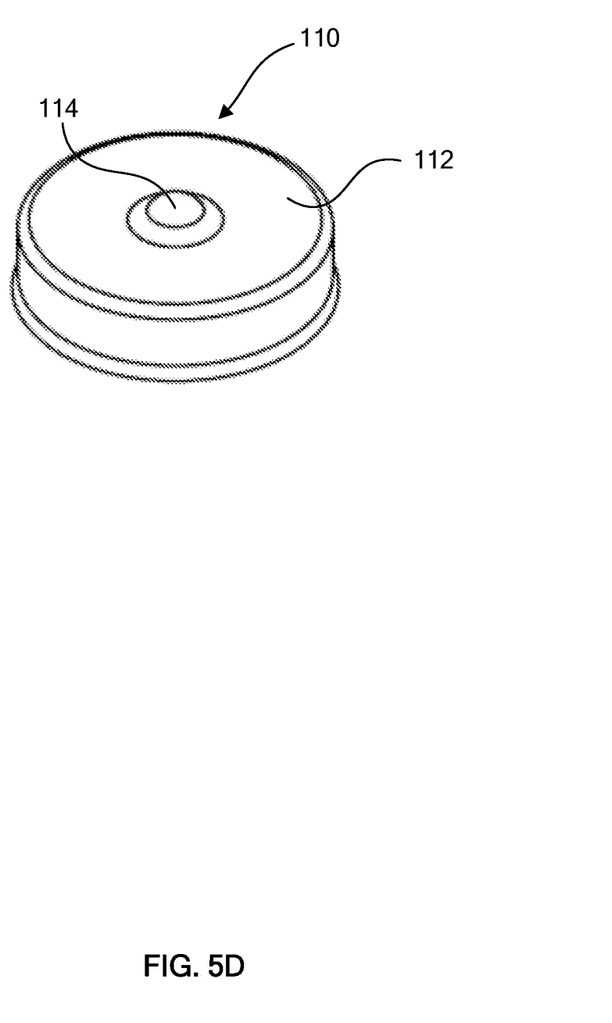

FIGS. 5A-D are schematics of the example rollover valve arrangement. FIG. 5A is a top view of the housing 14 of the example fuel delivery system 2. FIG. 5B is a side cutaway view of the fuel delivery system 2 taken along line A-A of FIG. 5A. FIG. 5C is side cutaway view of the fuel delivery system 2 taken along line B-B of FIG. 5A. FIG. 5D is an isolated perspective view of the lower cup 110. The convex portion 114 of the floor 112 keeps the stopper 100 from aligning with the axis 200 of the vent tube 54, so that the stopper 100 cannot rest naturally in line with the vent tube 54, and is unlikely to directly engage/block the vent tube 54 during non-rollover operation of the engine 4.

Figure 6:
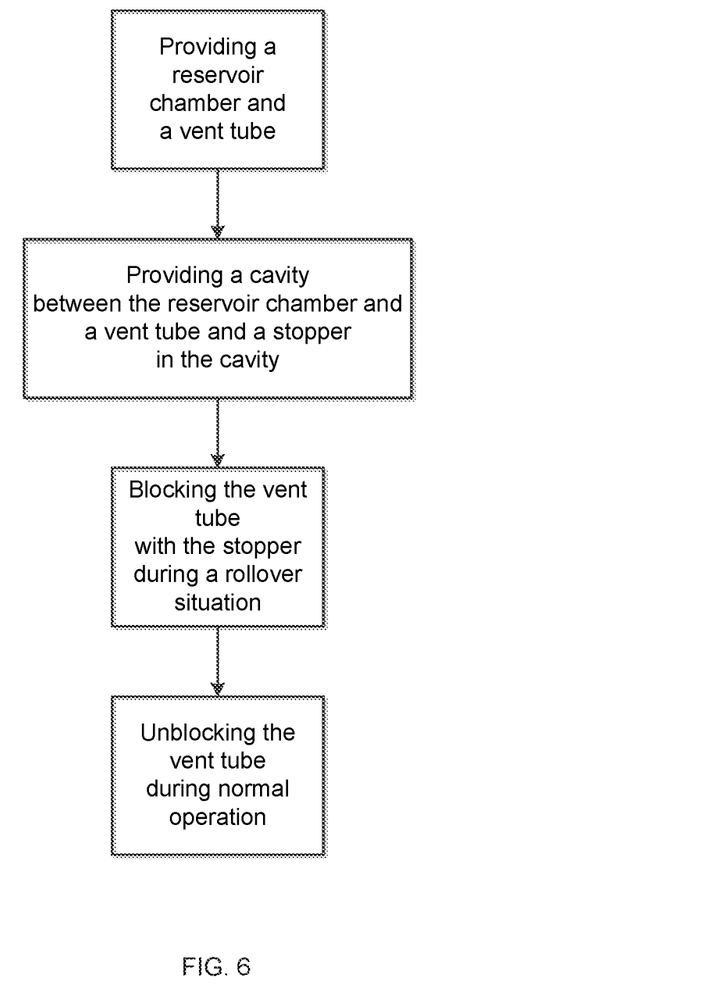
FIG. 6 is a flowchart of an example functioning of the rollover valve arrangement.

FIG. 6 is a flowchart of an example functioning of the rollover valve arrangement. In some examples, the reservoir chamber 18 is provided for a fuel delivery system for the engine 4, and a vent tube 54 vents gases from the reservoir chamber 18 during normal operation of the engine 4. A cavity 106 can be provided between the reservoir chamber 18 and an opening of the vent tube 54, with a stopper 100 provided in the cavity 106. The stopper 100 blocks the vent tube 54 during a rollover situation to prevent fuel from flowing out of the reservoir chamber 18 and into an environment 105 via the vent tube 54. A floor 112 with a convex portion 114 can be provided, e.g., below the vent tube 54, the convex portion 114 to prevent the stopper 100 from blocking the vent tube 54 during normal operation.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it is appreciated that different combinations of elements and/or functions may be provided by alternative embodiments without departing from the scope of the disclosure and the appended claims.

Many modifications and other embodiments set forth herein will come to mind to one skilled in the art having the benefit of the teachings presented in the foregoing descriptions and the associated drawings. Although specific terms are employed herein, they are used in a generic and descriptive sense only and not for purposes of limitation.

The invention claimed is:

1. A system, comprising:
   a reservoir chamber;
   a vent tube to vent gases from the reservoir chamber;
   walls between the reservoir chamber and the vent tube, the walls providing a seat and forming a cavity at an opening of the vent tube;
   a floor of the cavity, the floor including a convex portion protruding from the floor; and
   a stopper positioned in the cavity for sitting in the seat during a rollover situation.

2. The system of claim 1, wherein the walls are angled away from the seat at an angle between 30 degrees and 50 degrees.

3. The system of claim 1, wherein the convex portion is positioned in a center of the floor.

4. The system of claim 1, wherein a shape of the convex portion includes a dimple.

5. The system of claim 1, wherein the walls are straight.

6. The system of claim 1, wherein the walls are curved.

7. The system of claim 1, wherein the floor comprises a cup sitting within the cavity.

8. The system of claim 7, wherein the cup sits within spaced legs forming alternatively spaced flow path openings.

9. The system of claim 1, wherein the stopper comprises a ball.

10. A fuel delivery system of an engine, comprising:
    a cavity formed between a reservoir chamber and a vent tube, the cavity forming a seat at an entrance of the vent tube;
    a stopper positioned in the cavity for sitting in the seat during a rollover situation; and
    a floor of the cavity, the floor including a convex portion protruding from the floor to prevent the stopper from sitting in the seat during normal operation.

11. The fuel delivery system of claim 10, wherein the stopper comprises a ball.

12. The fuel delivery system of claim 10, wherein the convex portion comprises a dimple.

13. The fuel delivery system of claim 12, wherein the dimple comprises a round shape.

14. A method, comprising:
    providing a reservoir chamber for a fuel delivery system of an engine and a vent tube to vent the reservoir chamber;
    allowing the vent tube to vent fuel vapors out of the reservoir chamber during normal operation;
    blocking the vent tube with a stopper during a rollover situation to prevent fuel from flowing out of the reservoir chamber via the vent tube; and
    providing a cavity with a floor having a dimple below the vent tube, the dimple to prevent the stopper from blocking the vent tube during normal operation.

15. The method of claim 14, further comprising the stopper unblocking the vent tube when the engine is back in a normal position.

* * * * *